US012775690B1

(12) United States Patent
Shoshan et al.

(10) Patent No.: US 12,775,690 B1
(45) Date of Patent: Oct. 27, 2026

(54) SYSTEM FOR SUITABILITY ASSESSMENT OF BIOMETRIC INPUT

(71) Applicant: AMAZON TECHNOLOGIES, INC., Seattle, WA (US)

(72) Inventors: Alon Shoshan, Haifa (IL); Oron Anschel, Bethlehem of Galilee (IL); Rui Zhao, Bellevue, WA (US); Carlos D. Castillo, Seattle, WA (US); Igor Kviatkovsky, Haifa (IL); Manoj Aggarwal, Seattle, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/802,626

(22) Filed: Aug. 13, 2024

(51) Int. Cl.
*G06F 21/32* (2013.01)
*G06V 40/12* (2022.01)
*H04N 23/21* (2023.01)

(52) U.S. Cl.
CPC .......... *G06F 21/32* (2013.01); *G06V 40/1365* (2022.01); *H04N 23/21* (2023.01)

(58) Field of Classification Search
CPC ..... G06F 21/32; G06V 40/1365; H04N 23/21
See application file for complete search history.

(56) References Cited

U.S. PATENT DOCUMENTS 10,776,471 B2 * 9/2020 Tussy ...................... G06F 21/32
11,615,176 B2 * 3/2023 Jindal ...................... G06N 3/04
713/186

(Continued)

FOREIGN PATENT DOCUMENTS

CA 3044063 A1 * 6/2018 ......... G06V 40/1394
CA 3147524 A1 * 8/2022 ............ G06V 40/70

(Continued)

OTHER PUBLICATIONS

V. D. Mhaske, “Multimodal biometrics by integrating fingerprint and Palmprint for security”, Published in: 2013 IEEE International Conference on Computational Intelligence and Computing Research Date of Conference: Dec. 26-28, 2013, 5 pages (Year: 2013).*

*Primary Examiner* — Shahriar Zarrineh

(74) *Attorney, Agent, or Firm* — Weaver Austin Villeneuve & Sampson LLP

(57) ABSTRACT

A biometric identification system uses images acquired using different modalities. A suitability prediction module (SPM) is a machine learning model trained to accept an input image and provide a predicted distance value (PDV) as output. If the PDV is less than a threshold value, the input image may be deemed suitable for recognition. The SPM is trained using training data comprising first modality images and associated distance values. The training data is based on first modality images that are of unknown suitability and second modality images associated with the same identity that are presumed suitable. The second modality images are processed to determine a set of representation data in a representation space, from which a centroid in a representation space is calculated. The first modality image is processed to determine first representation data, and a distance in the representation space is calculated between the first representation data and the centroid.

20 Claims, 9 Drawing Sheets

(56) References Cited

U.S. PATENT DOCUMENTS

| | | | | |
|---|---|---|---|---|
| 11,804,060 | B1 * | 10/2023 | Zhao | G06F 18/2193 |
| 11,881,045 | B2 * | 1/2024 | Kim | G06V 10/955 |
| 12,254,718 | B1 * | 3/2025 | Fan | G06V 40/1318 |
| 2010/0266168 | A1 * | 10/2010 | Wang | G06V 40/1376 382/124 |
| 2016/0217567 | A1 * | 7/2016 | Keuchel | G06T 7/11 |
| 2016/0350574 | A1 * | 12/2016 | Weber | G06V 40/1335 |
| 2017/0039357 | A1 * | 2/2017 | Hwang | G06F 21/36 |
| 2017/0180336 | A1 * | 6/2017 | Josephson | G06F 21/32 |
| 2018/0173863 | A1 * | 6/2018 | Andersson | G06V 40/70 |
| 2019/0392189 | A1 * | 12/2019 | Kumar | G06V 10/80 |
| 2020/0151988 | A1 * | 5/2020 | Harding | G07C 9/37 |
| 2020/0296132 | A1 * | 9/2020 | Lv | H04L 63/1483 |
| 2021/0350506 | A1 * | 11/2021 | Chang | G06F 18/22 |
| 2024/0212811 | A1 * | 6/2024 | Vogler | G06N 3/084 |
| 2024/0233444 | A1 * | 7/2024 | Aggarwal | G06V 10/774 |

FOREIGN PATENT DOCUMENTS

| | | | | | |
|---|---|---|---|---|---|
| CN | 109583279 | A | * | 4/2019 | G06V 40/12 |
| CN | 110998600 | A | * | 4/2020 | G06V 40/1359 |
| CN | 115690855 | A | * | 2/2023 | |
| CN | 116386764 | A | * | 7/2023 | G16C 20/50 |
| CN | 116939530 | A | * | 10/2023 | H04W 4/33 |
| CN | 117854117 | A | * | 4/2024 | G06V 10/806 |
| EP | 3413235 | A1 | * | 12/2018 | G06V 40/1347 |
| EP | 3528158 | B1 | * | 11/2022 | G06V 10/811 |
| EP | 4343689 | A1 | * | 3/2024 | G06V 40/67 |
| JP | 2004086866 | A | * | 3/2004 | |
| JP | 2007328571 | A | * | 12/2007 | |
| JP | 2022025827 | A | * | 2/2022 | |
| WO | WO-2012038654 | A1 | * | 3/2012 | G06N 3/08 |
| WO | WO-2024025281 | A1 | * | 2/2024 | G16C 20/70 |
| WO | WO-2024247684 | A1 | * | 12/2024 | G06V 40/60 |

* cited by examiner

SYSTEM FOR SUITABILITY ASSESSMENT OF BIOMETRIC INPUT

BACKGROUND

Biometric input data may be used to recognize and assert identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
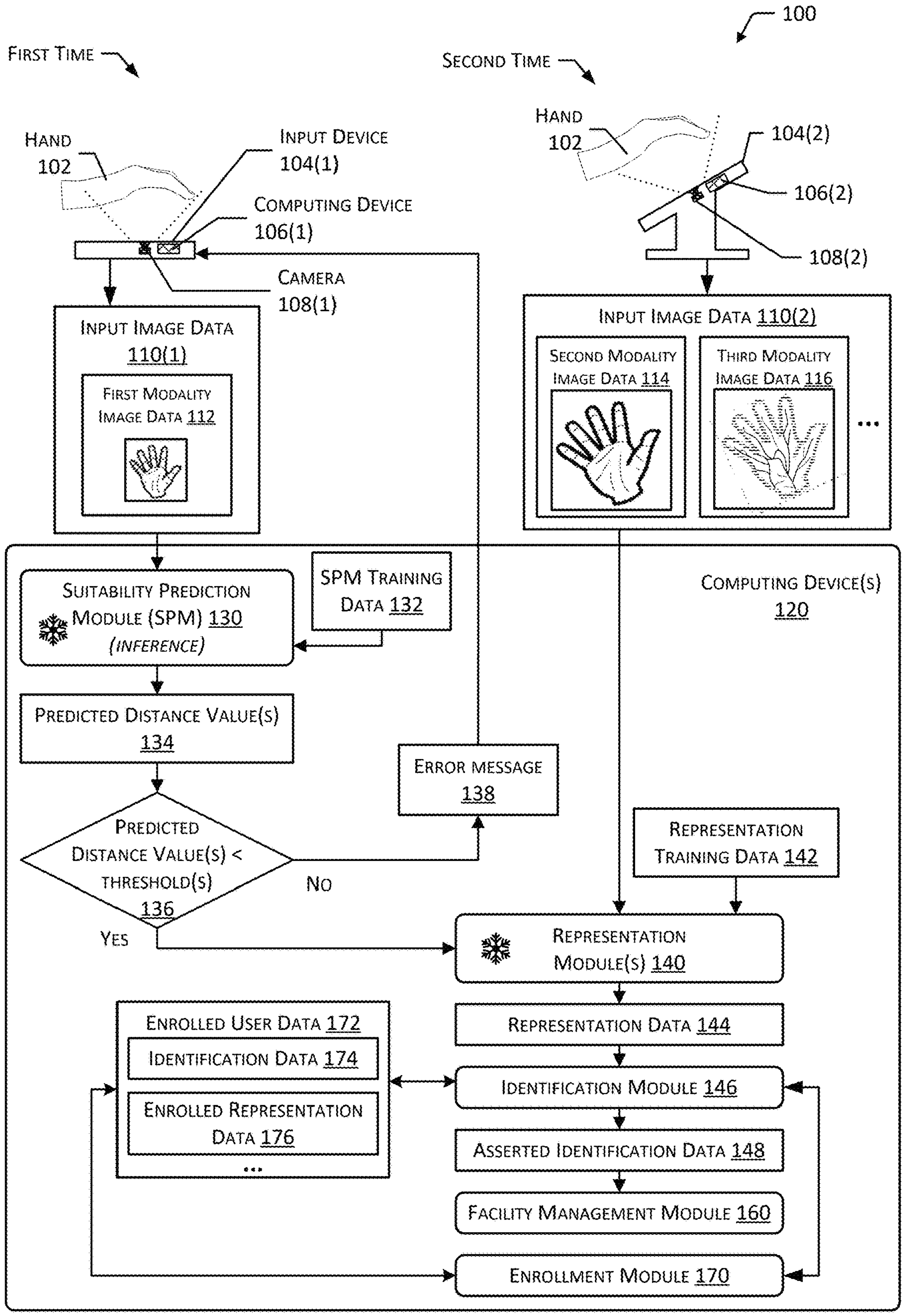
FIG. 1 illustrates a biometric identification system that assesses the suitability of biometric input with a suitability prediction module, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Biometric identification offers several advantages in a wide variety of use cases. For example, biometric identification may be used to facilitate payment at a point of sale, to provide access to a facility, and so forth.

Biometric identification may use various types of biometric input data. In one implementation the biometric input data may comprise one or more images of a hand. The biometric input data may be acquired using one or more modalities. For example, a first modality may comprise a visible light color image of a user's palm, while a second modality may comprise an image of surface features such as friction ridges (or "prints") of a user's palm acquired using infrared light, while a third modality may comprise an image of subcutaneous features such as veins of the user's palm acquired using infrared light. The use of information associated with multiple modalities provides several advantages for biometric identification. One advantage is the potential for at least partial decorrelation between some of the modalities that may improve overall accuracy. For example, different modalities may provide different features, providing more distinct information that may better distinguish one person from another, determine the presence of an artifact such as a realistic-appearing face mask or fake hand, and so forth. While some features may be common across the different modalities, other features vary. For example, the overall shape of the hand may be apparent across modalities, while information such as friction ridges, veins, and so forth may differ between images in the different modalities acquired of the same hand.

During operation, a biometric identification system uses input devices that acquire input data using different modalities. During an enrollment process, a user opts in to participate in using the system. The user may provide identification data, such as their name, account credentials, telephone number, and so forth. The user uses an input device to provide the biometric input data. For example, the user may present their hand to an input device that acquires biometric input image data comprising image data acquired with one or more modalities. The biometric input image data is processed to determine enrolled representation data that is stored for later use. The identification data is also stored and is associated with the enrolled representation data. At a later time, a match of query representation data to the enrolled representation data may then be used to assert the identity indicated by the associated identification data.

Different input devices used by the system may be capable of acquiring input image data in different modalities. For example, a smartphone may be able to acquire a first modality image using a visible light color camera, but lacks the infrared illuminators, infrared camera, and polarizers used to acquire second modality images and third modality images. Continuing the example, a point-of-sale input device may be able to acquire a second modality image and third modality image but lacks a visible light color camera and thus is unable to acquire a first modality image.

The input data acquired by the input devices may vary in suitability for use in subsequent identification. For example, input data that comprises an image that is well lit, in focus, with the hand in a specified pose and position in the image may be highly suitable for subsequent identification. In comparison, input data that comprises an image that is blurred, partially lit, and so forth may be unsuitable for subsequent identification.

During acquisition of input data with an input device, it is advantageous to assess the suitability. If input data is determined to be unsuitable, the input device may be directed to present output to the user requesting that they re-try providing the biometric input. Once input data has been deemed to be suitable, it may be subsequently processed to attempt to identify the user. By filtering out unsuitable input data, overall efficiency of the system is improved as unsuitable data is not processed, avoiding waste of computational resources. The overall accuracy of the system may also be improved as unsuitable data is not processed.

Some types of input devices may be prone to providing input data that is less suitable, while other types of input devices are more likely to provide suitable input data. For example, image data acquired by an end-user device such as a cellphone may be highly variable with regard to suitability. Continuing the example, the image may be blurred, the lighting may be uneven, and so forth. In comparison, image data acquired by a dedicated device such as a desktop scanner that is designed for biometric data acquisition may be more likely to be suitable.

The different types of input devices may acquire input data using different modalities. For example, the end-user device may acquire input image data in a first modality comprising a color red-green-blue (RGB) visible light image of the user's hand. In another example, the dedicated device may acquire input image data using a second modality comprising near-infrared print (NIRP) images and a third modality comprising near-infrared vein (NIRV) images.

Described in this disclosure are techniques and systems for determining the suitability of input data used by a biometric identification system. A suitability prediction module (SPM) comprising a machine learning network is trained to accept input data associated with a first modality or first type of device, and provide as output a predicted distance value (PDV). The PDV is a prediction as to a distance in a representation space between the input data and an identity centroid location in the representation space.

The SPM is trained using SPM training data comprising first modality input data and calculated distances. To generate the SPM training data, first modality image data and second modality image data associated with particular identities are processed to determine representation data. The suitability of first modality image data may be considered unknown, while the second modality image data is presumed to be suitable. For a given identity, a set of second modality image data is processed to determine a set of representation data in a representation space. An identity centroid is then calculated as a location in the representation space that is a geometrical centroid of that set of representation data.

The first modality image data is then processed to determine first representation data that is also in the representation space. A calculated distance may be determined that is indicative of a distance in the representation space between the first representation data and the identity centroid. In some implementations an ensemble approach may be used, in which distances in two or more representation spaces are used to determine the calculated distance. The first modality image data and the corresponding calculated distance may then be stored as SPM training data.

This process may be repeated using many instances of first modality image data and second modality image data for different identities, until the SPM training data is developed. The SPM training data may then be used to train the SPM to accept a first modality input image as input and determine the PDV.

By using these techniques and systems, the biometric identification system may quickly and efficiently determine the suitability of biometric input. This reduces the use of computational resources associated with processing unsuitable input. Overall accuracy of the system may also be improved. The use of the SPM allows the system to provide a more robust estimation of suitability compared to other techniques, such as manual development of filtering algorithms. The use of the second modality image data to determine an identity centroid allows SPM training data to be developed without the need for slow and costly traditional labelling of sample images.

Illustrative System

FIG. 1 illustrates a biometric identification system 100 that assesses the suitability of biometric input with a suitability prediction module, according to some implementations. The system 100 is described as being used as part of a biometric identification system that determines an identity of a user, however, the system and techniques described herein may be used in other situations.

The system 100 may operate in conjunction with one or more input devices 104(1), 104(2), . . . , 104(N). Each input device 104 may include a computing device 106 and a camera 108. The camera 108 has a field of view (FOV). During operation of the input device 104, the camera 108 acquires images of an object in the FOV, such as a hand 102 of the user, using one or more modalities and acquires input image data 110. For example, during operation the user may present their hand 102 with the palm or volar region of the hand 102 toward the input device 104. As a result, the input image data 110 provides an image of the palm of the hand 102. In other implementations, the input image data 110 may include the back of the hand 102. The images may comprise single images, a series of images, video data, or other image data. The input device 104 may include other components that are not shown. For example, the input device 104 may include lights that illuminate the object in the FOV, a communication interface, and so forth.

The hand 102 of the user is depicted positioned above the input devices 104(1) and 104(2) in this illustration. In other implementations, other configurations may be used. For example, the camera 108 of the input device 104 may have the FOV extending downwards, and the user places their hand 102 in the FOV under the input device 104.

At a first time, a hand 102 of a user is depicted positioned above an input device 104(1) and input image data 110(1) is acquired. In some implementations the input device 104 may comprise an end-user device. The input device 104 that comprises an end-user device may be designed for purposes other than the acquisition of biometric input data for use by the system 100. For example, the end-user device may comprise a cellphone, a tablet computer, a home electronic device such as a smart display, a personal computer, a doorbell security camera, a robot, and so forth that includes a camera 108. In this implementation, the input device 104(1) comprises a smartphone that includes a camera 108(1). The camera 108(1) provides input image data 110(1) as output. For example, the camera 108(1) may comprise a visible light (VL) color camera that provides as output first modality image data 112 comprising a color VL image comprising red, green, and blue (RGB) channels. During operation, as described below in more detail, the first modality image data 112 is processed by one or more computing devices 120.

At a second time, the user may use another input device 104(2). In some implementations the input device 104 may comprise a dedicated device, that is designed for the acquisition of biometric input data for use by the system 100. In one implementation, the input device 104 such as the input device 104(2) depicted in FIG. 1, is configured to acquire images of the hand 102 that are illuminated using infrared light emitted from one or more illuminators that has two or more particular polarizations, with different illumination patterns, and so forth. In another implementation, the input device 104 may acquire images of the hand 102 as illuminated using different wavelengths of light, such as visible light and infrared-light. The infrared light may be near-infrared, such as having a wavelength that is less than four micrometers. Separate images associated with different modalities may be acquired using different combinations of polarized light provided by the infrared illuminators.

Depending upon one or more of the polarization or wavelengths used, the images produced by the input device 104 may be of second modality features or third modality features. In one implementation, the second modality may utilize images in which the hand 102 is illuminated with infrared light having a first polarization and obtained by an infrared camera 108(2) with a polarizer passing light to the camera 108(2) that also has the first polarization. In another implementation, the second modality may utilize images in which the hand 102 is illuminated with a first wavelength of light, such as monochromatic visible light, without regard to polarization.

Second modality features may comprise features that are close to, or on, a surface of the hand 102 of the user. For example, the second modality features may include surface features such as creases, wrinkles, scars, dermal papillae ridges, and so forth in at least the epidermis of the hand 102. Second modality image data 114 acquired using the second modality may be associated with one or more surface features.

Third modality features comprise those features that are below the epidermis. In one implementation, the third modality may utilize images in which the hand 102 is illuminated with infrared light having a second polarization and obtained by the infrared camera 108(2) with the polarizer passing light to the infrared camera 108(2) with the first polarization. For example, the third modality features may include subcutaneous anatomical structures such as veins, bones, soft tissue, and so forth. In another implementation, the third modality may utilize images in which the hand 102 is illuminated with a second wavelength of light, such as monochromatic infrared light, without regard to polarization.

Some features may be visible in both second modality and third modality images. For example, a crease in the palm may include second modality features on the surface as well as deeper third modality features within the palm. Third modality image data 116 acquired using the third modality may be associated with one or more subcutaneous features, such as veins.

Separate images may be acquired using the second and third modalities using different combinations of polarized light provided by infrared illuminators. For example, the infrared illuminators may comprise light emitting diodes (LEDs), electroluminescent devices, lasers, incandescent lamps, and so forth. The input image data 110 may comprise images acquired using a plurality of modalities. For example, the input image data 110(2) may comprise a first image acquired using a second modality, a second image acquired using a third modality, and so forth. Multiple images of the same object may be acquired in rapid succession with respect to one another. For example, the camera 108 may operate at 60 frames per second and acquire individual frames of nth modality image data.

In one situation, the user may enroll to use the biometric identification system 100 using the input device 104(1), and subsequently use other input devices 104 including the input device 104(2). In another situation, the user may enroll to use the biometric identification system 100 using the input device 104(2), and subsequently use other input devices 104 including the input device 104(1). Once enrolled, the user may utilize the biometric identification system 100 to assert their identity. Enrollment is discussed in more detail with regard to the enrollment module 170.

Returning to the first time, the input device 104(1) provides input image data 110(1) comprising first modality image data 112 to the computing devices 120. In some implementations at least a portion of the operations performed by the computing devices 120 may be performed by the computing device 106 at the input device 104.

A computing device 120 is shown. One or more computing devices 120 may execute one or more of the following modules. The computing device 120 accepts input image data 110 and uses a suitability prediction module (SPM) 130 to determine one or more predicted distance values (PDV) 134. The SPM 130 comprises a machine learning system, such as a neural network or other architecture, that has been trained using SPM training data 132. The determination of the SPM training data 132 and the training of the SPM 130 is discussed in more detail with regard to FIGS. 4-8.

In one implementation, each of the PDVs 134 may be considered to be a prediction of a distance in a representation space between representation data based on the first modality image data 112 and an identity centroid based on a plurality of instances of representation data for the same identity that are based on another modality that is deemed to contain more suitable biometric data, such as the second modality image data 114 obtained using the dedicated input device 104(2).

The suitability of biometric input, such as input image data 110, may be assessed on the basis that a suitable image results in representation data that is relatively "close" in the representation space to known good representation data for the same identity. In contrast, an unsuitable image, such as one that is blurred, improperly illuminated, contains the hand 102 in an improper pose, and so forth would be expected to result in representation data that is farther away from the known good representation data for the same identity. As described in the following figures, the SPM 130 is trained so that at inference it is able to determine the PDV 134 without prior knowledge of the identity of the user.

The computing device 120 may use the PDV 134 to determine if the input image data 110(1) is suitable for further processing. A PDV 134 may be compared to a respective threshold value. In some implementations, a plurality of PDVs 134 may be determined by the SPM 130. In such implementations, various techniques may be used to determine suitability. For example, a first PDV 134 that is associated with a first representation space may be compared to a first threshold value, while a second PDV 134 that is associated with a second representation space may be compared to a second threshold value. For example, at 136 the one or more PDVs 134 may be compared to one or more respective threshold values. If at 136 the one or more PDVs 134 are less than the respective threshold values, the input image data 110(1) may be deemed suitable and be provided to one or more representation modules 140 for further processing. If the one or more PDVs 134 are greater than or equal to the respective threshold values, the input image data 110(1) may be deemed to be unsuitable and an error message 138 may be generated. In other implementations other comparisons may be performed at 136 to determine suitability of the input image data 110. For example, the comparison performed at 136 may be that all PDVs 134 are less than their respective threshold values for input image data 110 to be deemed suitable, or that if any one of the PDVs 134 is less than the respective threshold value the input image data 110 may be deemed suitable.

In some implementations a plurality of PDVs 134 may be fused using various techniques to determine a single PDV 134 that is then compared to a threshold value. For example, a sum of PDVs 134 may be calculated, a weighted average of PDVs 134 may be calculated, a maximum PDV 134 out of a plurality of PDVs 134 may be determined, and so forth.

The error message 138 may be returned to the input device 104 that originated the input image data 110. For example, the error message 138 may be returned to the input device 104(1). Responsive to this error message 138, the input device 104(1) may present a user interface that requests the user acquire another instance of input image data 110.

One or more representation modules 140 accept input image data 110 as input and provide as output representation data 144. The representation data 144 is representative of at least some features depicted in the corresponding input image data 110.

In some implementations the representation data 144 may comprise one or more vector values in an embedding space, or values from one or more penultimate layers of a machine learning network, such as a neural network. The representation data 144 is associated with a representation space. For example, the representation space may comprise the various dimensions that are used to express the embedding vector. Comparisons may be performed between instances of representation data 144 that are associated with the same representation space. Geometric relationships determined between instances of representation data 144 within the same representation space may be calculated. For example, a Euclidean distance may be calculated between instances of representation data 144 in the same representation space. In another example, a geometric centroid may be calculated between instances of representation data 144 in the same representation space.

Each modality used by the system 100 may be associated with one or more representation spaces. For example, the first modality may be associated with a first representation space, a second representation space, and so forth.

Each representation space used by the system 100 may be associated with one or more modalities. For example, a representation module 140 may be trained to accept images associated with two or more modalities as inputs and determine representation data 144 in a representation space.

For ease of discussion and illustration in this disclosure, and not necessarily as a limitation, three modalities are shown. In other implementations, other modalities may be used. For example, four or more modalities or different modalities may be used by the system 100.

During operation of the system 100, the input device 104 provides input image data 110 to the computing devices 120. In this illustration at a first time, the input device 104(1) provides input image data 110(1) comprising first modality image data 112 to the computing device 120. At a second time, the input device 104(2) provides input image data 110(2) comprising second modality image data 114 and third modality image data 116 to the computing device 120.

The representation module 140 accepts as input the input image data 110 associated with one or more modalities and provides as output representation data 144 in a corresponding representation space. For example, representation module 140(1) accepts first modality image data 112 and second modality image data 114 and provides as output representation data 144(1). The output from each representation module 140 is associated with a particular representation space.

The representation module 140 may comprise a machine learning system that has been trained using representation training data 142 to determine representation data 144 based on input image data 110. The representation module(s) 140 may comprise a machine learning network. For example, each representation module 140 may implement a convolutional neural network (CNN) that includes an inverted residual layer with linear bottleneck, such as that implemented by the MobileNetV2 architecture described by Sandler, et. al. In other implementations, other machine learning architectures may be used. As part of the training, the representation module(s) 140, or portions thereof, determine trained model data that is used to operate the representation modules 140 during inference. The representation modules 140 are trained using representation training data 142. Training of the representation module(s) 140 is discussed in more detail with regard to FIGS. 2-3. Once trained, the representation module(s) 140, or a portion thereof, may be used at inference to process input such as the input image data 110 and provide as output the representation data 144.

During operation, the computing device 120 accepts input image data 110 from an input device 104 and provides a set of representation data 144 that may be used by an identification module 146. The identification module 146 accepts as input a set of representation data and compares the set of representation data to previously stored information, such as enrolled user data 172. For example, the comparison may comprise determining a distance in a representation space between the representation data 144 associated with the input image data 110 and enrolled representation data 176.

During "enrollment time", users are able to utilize the system 100 by performing an enrollment process. The enrollment process may be completed at once, or after two or more encounters with input devices 104. The enrollment module 170 may coordinate the enrollment process. Enrollment may associate biometric information, such as representation data 144 based on input image data 110 with particular identification data 174 comprising information such as a name, account number, address, and so forth. In some implementations the identification data 174 may comprise data acquired during operation of the input device 104(1). For example, the user may enter account login credentials to an application executing on the input device 104. The identification data 174 may be determined based at least in part on a successful login to a participating service, website, device, and so forth.

During the enrollment process, the user opts in and presents their hand 102 to the input device 104. The input device 104 acquires input image data 110 that is then provided to the computing device 120 executing the trained representation modules 140(1)-(N). The trained representation modules 140(1)-(N) accept as input the input image data 110 and provides as output a first set of representation data that is stored as enrolled representation data 176. The enrolled representation data 176 is representative of at least some of the features depicted in the input image data 110. In some implementations, the enrolled representation data 176 may comprise one or more vector values in one or more embedding spaces. The enrolled representation data 176 may comprise data associated with one or more intermediate layers or a final layer of the respective representation modules 140. The identification data 174 is associated with the enrolled representation data 176.

During subsequent usage of the input devices 104, input image data 110 and resulting representation data 144 may be acquired and stored as enrolled representation data 176. For example, as the user utilizes an input device 104 with different modalities, their enrolled representation data 176 may comprise representation data 144 that is associated with those different modalities.

During the enrollment process, the representation data 144 may be checked using the identification module 146 to determine whether the user has been previously enrolled. If so, the enrollment process may be skipped. A comparison module may compare the set of representation data, that is associated with the input image data 110 acquired by the input device 104, to previously stored data, such as the enrolled representation data 176 to determine asserted identification data 148.

In one implementation, the asserted identification data 148 may comprise a user identifier associated with the shortest distance in the representation space(s) between previously stored enrolled representation data 176 and the input representation data 144 associated with the user who presented their hand 102 during identification time. The identification module 146 may utilize other considerations, such as requiring that the query representation data is no more than a maximum distance in the embedding space from the enrolled representation data 176 of a particular user before determining the asserted identification data 148.

The asserted identification data 148 may then be used by subsequent systems or modules. For example, the asserted identification data 148, or information based thereon, may be provided to a facility management module 160.

The facility management module 160 may use the asserted identification data 148 to associate an identity with the user as they move about a facility. For example, the facility management module 160 may use data from cameras or other sensors in the environment to determine a location of the user. Given a known path of the user from an entrance that utilizes the input device 104, the user identity indicated in the identification data 174 may be associated with the user as they use the facility. For example, the now identified user may walk to a shelf, remove an item, and leave the facility. The facility management module 160 may determine the interaction data indicative of the removal of the item as being associated with the user identifier specified in the asserted identification data 148, and bill an account associated with the user identifier. In another implementation, the facility management module 160 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

In some implementations the input device 104 may acquire other input data. For example, the input device 104 may acquire an image of the user's face. In another example the input device 104 may acquire audio data comprising speech from the user.

Figure 2:
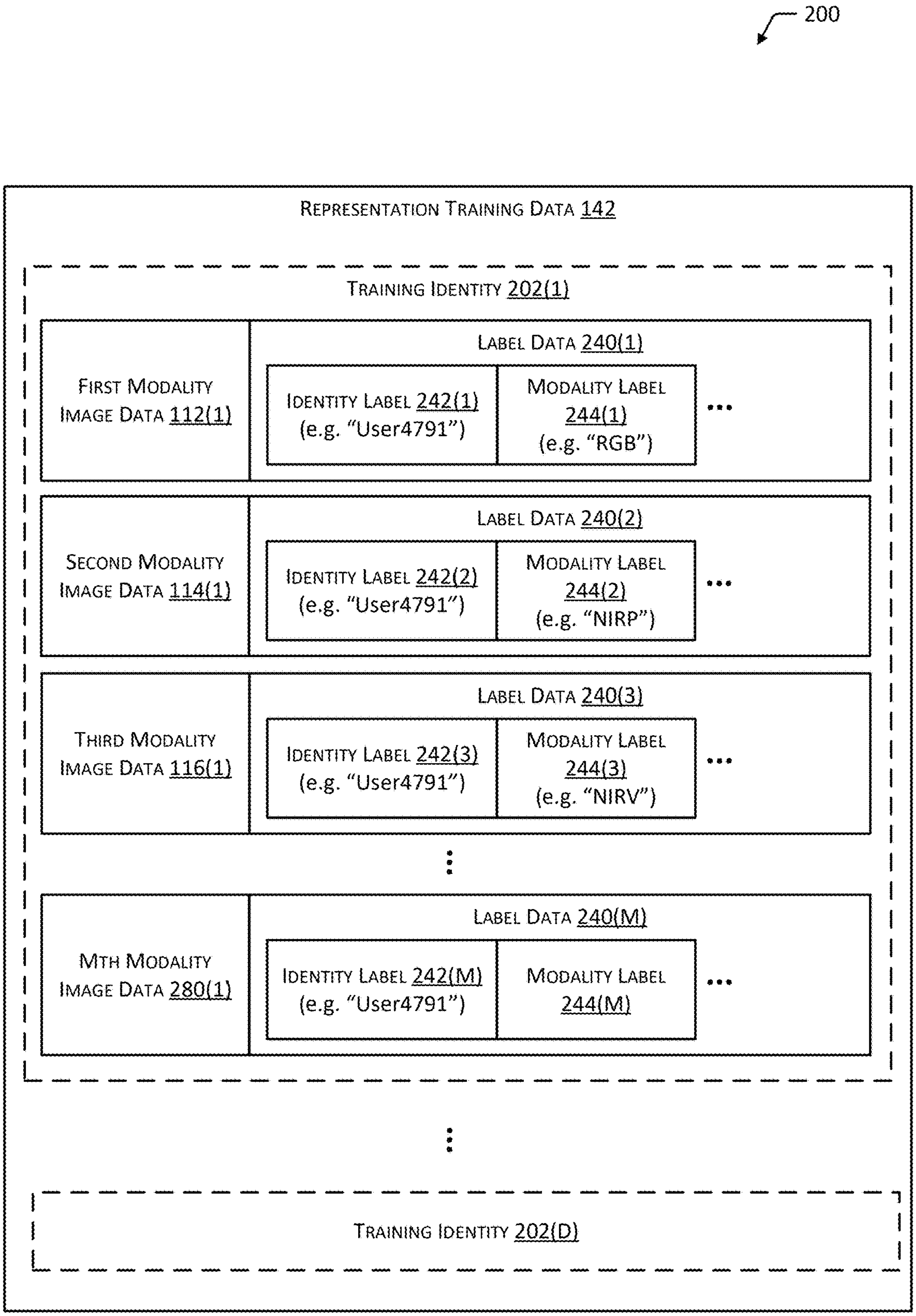
FIG. 2 illustrates representation training data for training of a representation module that accepts different modalities as inputs, according to some implementations.

FIG. 2 illustrates at 200 representation training data 142 for training of representation modules 140, according to some implementations. The representation training data 142 comprises a plurality of images that are representative of a plurality of training identities, 202(1), 202(2), . . . , 202(D). Each training identity 202 is considered to be unique with respect to the other training identities 202.

The information associated with each training identity 202 may comprise actual image data acquired from users who have opted in to provide information for training, synthetic input data that has been generated, or a combination thereof. In one implementation, the representation training data 142 may exclude individuals who have enrolled to use the system 100 for identification. For example, enrolled users having identification data 174 may be excluded from inclusion in the representation training data 142. In another implementation, some enrolled users may opt in to explicitly permit input image data 110 obtained during enrollment to be stored as representation training data 142.

The synthetic input data may comprise synthetic data that is consistent with expected input image data 110. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 202(1)-202(D) includes modality image data and associated label data 240. The label data 240 may comprise information such as an identity (ID) label 242, modality label 244, and so forth. Each training identity 202 may include an identity label 242 that indicates a particular training identity. The identity label 242 may be used to distinguish one training identity 202 from another. In implementations where actual input data is used as part of the representation training data 142, the identity label may be assigned independently of the actual identification data 174 associated with that user. For example, the identity label may have a value of "User8472" and not the actual identity of "Jules Verne".

The identity label 242 may be used to distinguish one sample from another. The modality label 244 indicates whether the associated image data is representative of a first modality, second modality, and so forth.

In this illustration, each training identity 202(1)-(D) includes input image data 110, an identity label 242, and a modality label 244, for a plurality of modalities. For example, the representation training data 142 for a training identity 202 may include Mth modality image data 280(1) and associated identity label 242(M) and modality label 244(M).

In other implementations other labels may be included.

Figure 3:
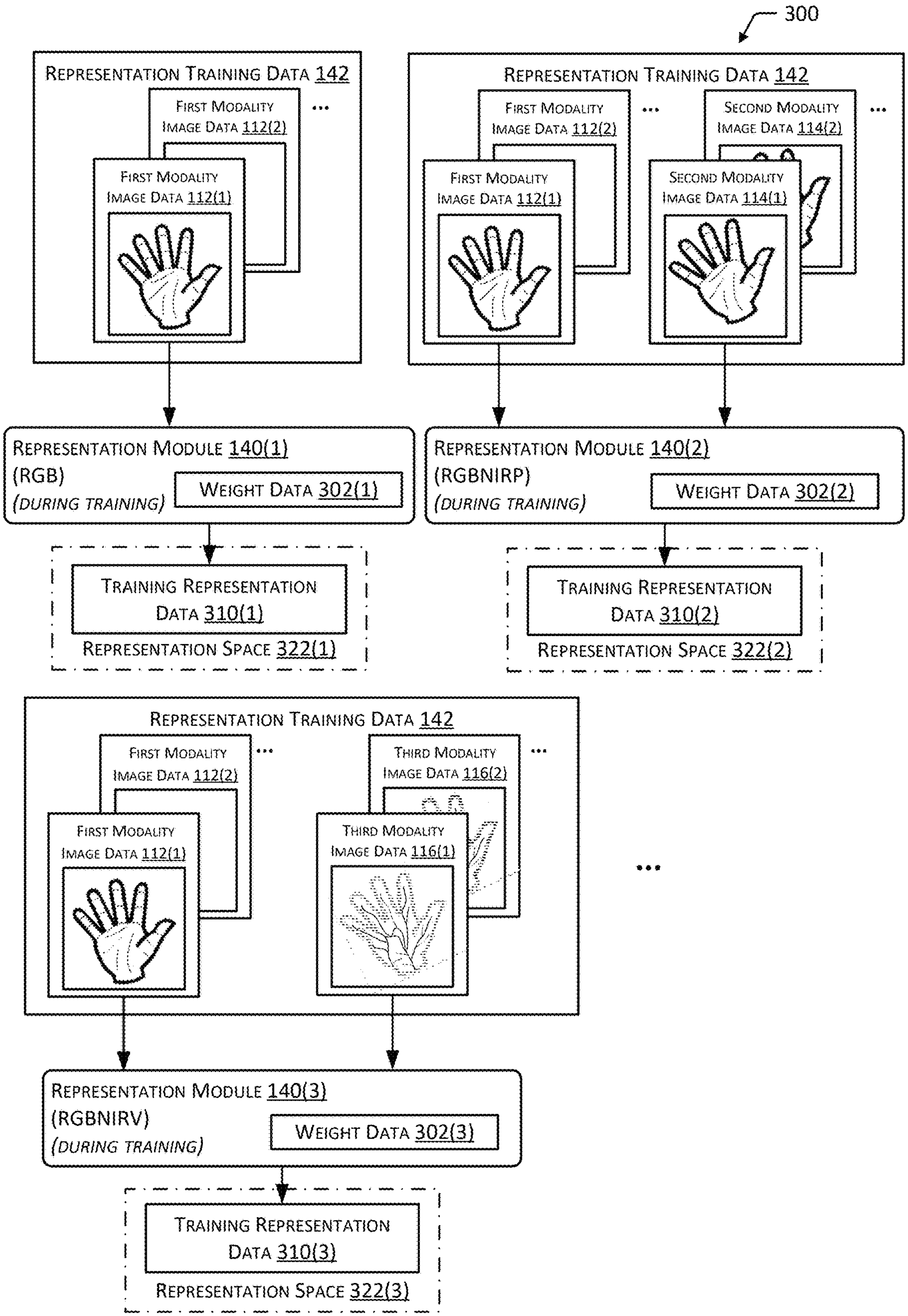
FIG. 3 illustrates training of representation modules, according to some implementations.

FIG. 3 illustrates at 300 training of representation modules 140, according to some implementations. The representation module 140, and training thereof, may be implemented by one or more computing devices 120.

In one implementation each of the representation modules 140 comprises a respective machine learning network. In other implementations representation modules 140 may share at least a portion of a common machine learning network, utilizing different branches or heads of that common machine learning network. The machine learning network may comprise a convolutional neural network, deep learning network, or other architecture.

During training, the representation module 140 accepts batches of representation training data 142 and generates first training representation data 310(1). A loss function is then used to assess the first training representation data 310(1) or other output and determine a loss value. The loss value may then be provided as feedback to modify one or more instances of weight data 302 of the representation module 140. For example, the representation module 140 may comprise a neural network with nodes having weight data 302 comprising various weight values, bias values, and so forth that affect data processing through that node. Based on the loss value, one or more of these weight values, bias values, and so forth may be changed. After many iterations of the training process, the representation module 140 may produce output that is suitable for use. For example, the output may be trained to provide representation data 144, such as an embedding vector, that is representative of biometric features in the input and is suitable for distinguishing one identity from another.

With regard to training the first representation module 140(1), the representation training data 142 comprises first modality image data 112 that is associated with the respective training identities 202. The first representation module 140(1) performs many iterations of the learning process, processing first modality image data 112 and modifying weight data 302(1) based on the loss values determined from each iteration. The training representation data 310(1) determined by the first representation module 140(1) is associated with the first representation space 322(1). For example, the training representation data 310(1) may comprise embedding vectors that are within a first embedding space.

With regard to training the second representation module 140(2), the representation training data 142 comprises pairs of first modality image data 112 and second modality image data 114 that are associated with the same training identity 202. The second representation module 140(2) performs many iterations of the learning process, processing representation training data 142 and modifying weight data 302(2) based on the loss values determined from each iteration. The training representation data 310(2) determined by the second representation module 140(2) is associated with the second representation space 322(2). For example, the training representation data 310(2) may comprise embedding vectors that are within a second embedding space.

With regard to training the third representation module 140(3), the representation training data 142 comprises pairs of first modality image data 112 and third modality image data 116 that are associated with the same training identity 202. The third representation module 140(3) performs many iterations of the learning process, processing representation training data 142 and modifying weight data 302(3) based on the loss values determined from each iteration. The training representation data 310(3) determined by the third representation module 140(3) is associated with the third representation space 322(3). For example, the training representation data 310(3) may comprise embedding vectors that are within a second embedding space.

Other representation modules 140 used by the system 100 may be trained in similar fashion, or using other techniques.

Figure 4:
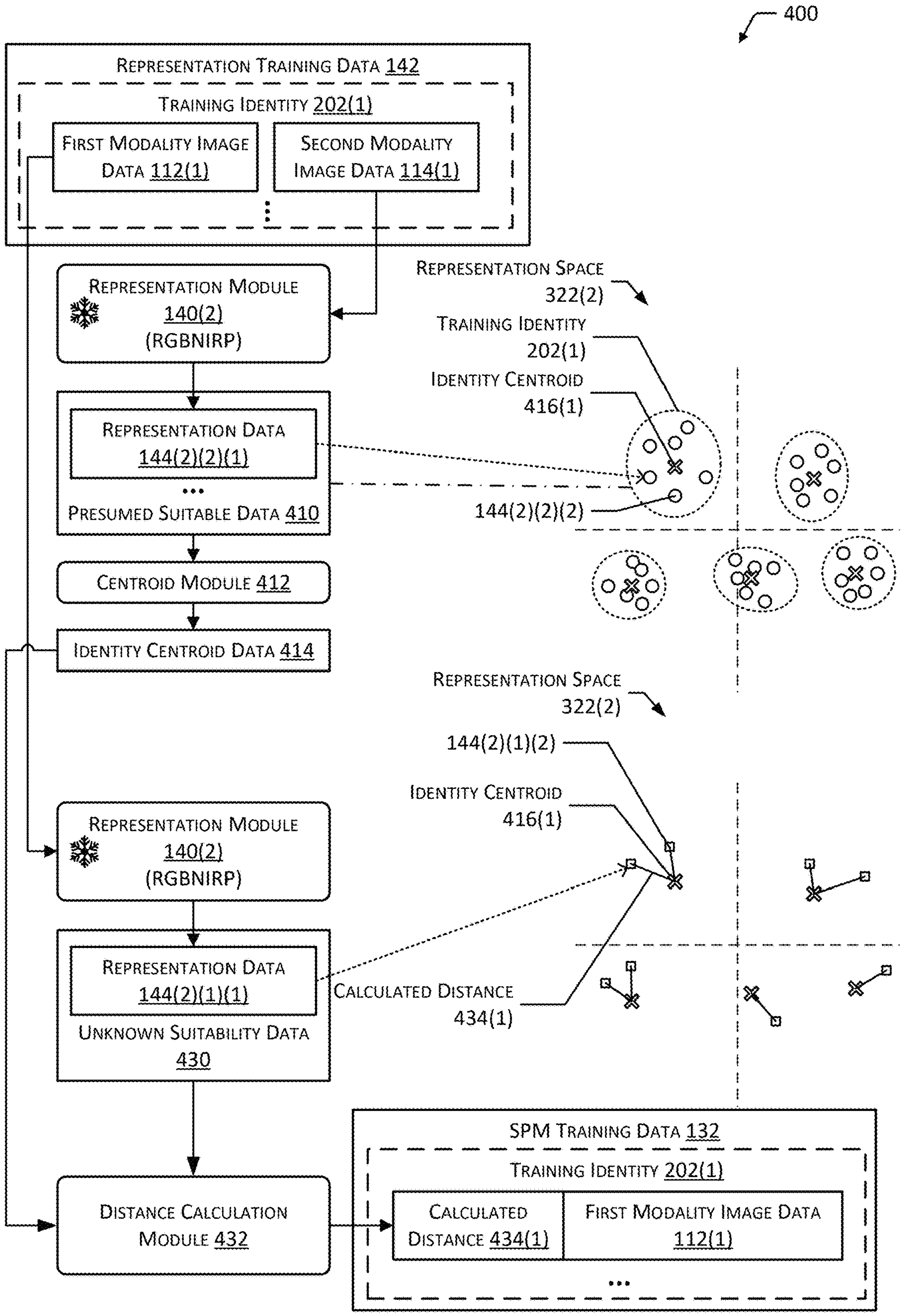
FIG. 4 illustrates generation of training data for training the suitability prediction module, according to some implementations.

FIG. 4 illustrates at 400 generation of SPM training data 132 for training the SPM 130, according to some implementations. A portion of the representation training data 142 is depicted for a single training identity 202, such as indicated by the identity label 242. The operations described with regard to FIG. 4 may be performed for a plurality of different training identities 202 to generate SPM training data 132 that is based on a plurality of different identities. For ease of description, and not as a limitation, the operations associated with processing a single training identity 202 are described in this figure.

A set of input image data 110 that is associated with a particular modality is processed by a representation module 140 to determine a set of presumed suitable data 410. In the implementation depicted here, the second modality image data 114 is deemed to be suitable for use. For example, the second modality image data 114 may be obtained using a dedicated device such as the input device 104(2). A plurality of instances of second modality image data 114 that are associated with a training identity 202 are processed by the representation module 140(2) to determine a set of representation data 144. In this implementation shown, the representation module 140(2) is trained to accept as input first modality image data 112 or second modality image data 114 and provide as output representation data 144(2) that is associated with the representation space 322(2).

The set of representation data 144(2) may be designated as presumed suitable data 410 in that the input image data 110 used to generate the set is presumed to be suitable for use. The presumption of suitability may be made based on one or more of the modality used, the type of input device 104 used, or other considerations. For example, if second modality image data 114 is only acquired using the second input device 104(2), and the second input device 104(2) is a dedicated device that is deemed to generate suitable input image data 110, then the second modality image data 114 may be presumed to be suitable for use. In some implementations the input device 104 or modality that is associated with the presumed suitable data 410 may be subject to prior filtering. Continuing the earlier example, a dedicated device such as the input device 104(2) may implement one or more filter algorithms such as blurriness detection, underexposure detection, and so forth, with the result being that the input image data 110 produced by the dedicated device, after such filtering, is more suitable for subsequent processing by the system 100.

The set of representation data 144 may comprise a plurality of instances of representation data 144(2)(2)(1)-144(2)(2)(P). In this illustration, the representation data 144 is denoted with the suffixes being indicative of the representation module 140 used, modality, and individual sample or instance of image data. For example, "representation data 144(2)(2)(3)" denotes representation data 144 that was generated by the representation module 140(2), with a second modality as input, using the third sample of image data.

Depicted is a first illustration showing a plurality of instances of representation data 144(2)(2)(P) that are associated with a training identity 202(1) in the representation space 322(2). The presumed suitable data 410, comprising the set of representation data 144(2)(2)(1)-144(2)(2)(P) that is associated with a particular training identity 202(1) is provided as input to a centroid module 416. The centroid module 412 determines identity centroid data 414 indicative of an identity centroid 416 in the representation space 322. The identity centroid data 414 may be indicative of a location within the representation space 322. For example, the identity centroid data 414(1) may comprise a vector value indicative of a location of the identity centroid 416(1) in the representation space 322(2). In this illustration, the identity centroid 416(1) indicates the geometric center of the set of representation data 144(2)(2)(1) that is associated with the training identity 202(1). Likewise, other identity centroids 416 may be calculated for other training identities 202, as shown in FIG. 4.

In other implementations, other techniques may be used instead of, or in addition to, the centroid module 412. In some implementations outliers in the set of representation data 144 may be discarded or removed from the presumed suitable data 410, before processing by the centroid module 412.

The same representation module(s) 140 used to determine the identity centroid data 414 is also used to determine unknown suitability data 430 comprising representation data 144. In the implementation depicted here, the first modality image data 112 is deemed to be of unknown suitability for use. For example, the first modality image data 112 may be obtained using an end-user device such as the input device 104(1). The instance of first modality image data 112 is processed by the representation module(s) 140 to determine the representation data 144. In this example, the representation module 140(2) processes the first modality image data 112(1) to determine representation data 144(2)(1)(1).

The identity centroid data 414 and the unknown suitability data 430 comprising representation data 144 is provided as input to a distance calculation module 432. The distance calculation module 432 determines a distance, in a respective representation space 322 between the identity centroid 416 and the representation data 144 of the unknown suitability data 430. In some implementations this may comprise a Euclidean distance.

The use of the identity centroid 416 based on the presumed suitable data 410 allows for the SPM training data 132 to be readily developed without the need for costly and time consuming annotation or curation of samples of input image data 110. For example, there is no need for a human operator to manually label images as "suitable" or "unsuitable", substantially reducing the cost of developing the SPM training data 132. While the presumed suitable data 410 may inadvertently include some individual instances of low suitability input image data 110, the determination of the identity centroid 416 mitigates these effects. The ability to efficiently generate a large set of SPM training data 132 also allows the SPM 130 to be trained to assess suitability in a broader sense, consistent with overall operation of the system 100, rather than a particular aspect that may be inadvertently focused on by human annotation.

In some implementations, a first ensemble approach may be used to determine the calculated distance 434 by using a plurality of representation modules 140 to process the representation training data 142. For example, each sample of the second modality image data 114 may be processed by a plurality of representation modules 140, each providing representation data 144 output in a respective set of representation spaces 322. Each sample of the first modality image data 112 may also be processed by the plurality of representation modules 140. The distance calculation module 432 may determine the respective calculated distances 434 in the respective representation spaces 322, and then combine those. For example, the calculated distance 434 associated with an instance of first modality image data 112 may comprise an average of the individual calculated distances 434 associated with the plurality of representation spaces 322.

In some implementations, a second ensemble (not shown) approach may be used to determine one or more calculated distances 434 by using a plurality of modalities and their associated representation modules 140 to process the representation training data 142. For example, in addition to processing the second modality image data 114(1), the third modality image data 116(1) may be processed by the representation module 140(3) (RGBNIRV), providing output in another representation space 322(3). Each associated sample of the first modality image data 112 may also be processed by the representation module 140(3) to determine representation data 144 in the representation space 322(3). In addition to the calculated distance 434(1) in the representation space 322(2), a calculated distance 434(2) may be determined in the representation space 322(3). In one implementation the calculated distances 434(1) and 434(2) may be maintained as separate data and stored in association with their respective representation spaces 322 in the SPM training data 132. In another implementation, the calculated distances 434 for the plurality of representation spaces 322 may be used to determine a single calculated distance 434 that is stored as the SPM training data 132. For example, the calculated distance 434 stored as the SPM training data 132 may comprise an average, weight sum, or other value based on the calculated distances 434(1) and 434(2).

The result of these operations may comprise the calculated distance 434 that is associated with a particular sample of input image data 110, such as the first modality image. The SPM training data 132 may comprise instances of calculated distances 434 and their associated instances of input image data 110, such as the first modality images 112 shown here.

The representation module(s) 140 used to determine the SPM training data 132, such as representation module 140(2) shown in FIG. 4, may differ from the representation modules 140 that provide representation data 144 for use by the identification module 146, the enrollment module 170, and so forth. For example, the representation modules 140 used to determine the presumed suitable data 410 and the unknown suitability data 430 may be different from those that are used to determine the asserted identification data 148. In some implementations, the representation module(s) 140 used to determine the SPM training data 132 may have fewer layers, have been trained using smaller sets of representation training data 142, have different architectures, and so forth compared to their counterparts that provide representation data 144 to the identification module 146 or the enrollment module 170.

It is understood that the techniques described in this application may be modified to use different combinations of modalities, input device 104, and so forth. For example, in some implementations the second modality image data 114 may be deemed to be of unknown suitability and may be used to determine the unknown suitability data 430, while the first modality image data 112 may be deemed to be of presumed good suitability and used to determine the presumed suitable data 410.

In some implementations, the operations described in this disclosure, such as those with regard to FIGS. 4-8 may utilize input devices 104 that acquire input image data 110 using the same modality(ies) but with different assurances of quality with regard to that input. For example, instead of a first modality being RGB and the second modality being a near-infrared print image, the presumed suitable data 410 may be based on the processing of input image data 110 that is acquired using a dedicated device that is deemed to provide suitable input image data 110, while the unknown suitability data 430 may be based on the processing of input image data 110 that is acquired using an end-user device that is deemed to provide input image data 110 with unknown suitability or suitability that is more likely to be unsuitable.

It is understood that the techniques described in this application may be modified to use different combinations of modalities, input device 104, and so forth. For example, in some implementations the second modality image data 114 may be deemed to be of unknown suitability and may be used to determine the unknown suitability data 430, while the first modality image data 112 may be deemed to be of presumed good suitability and used to determine the presumed suitable data 410.

Figure 5:
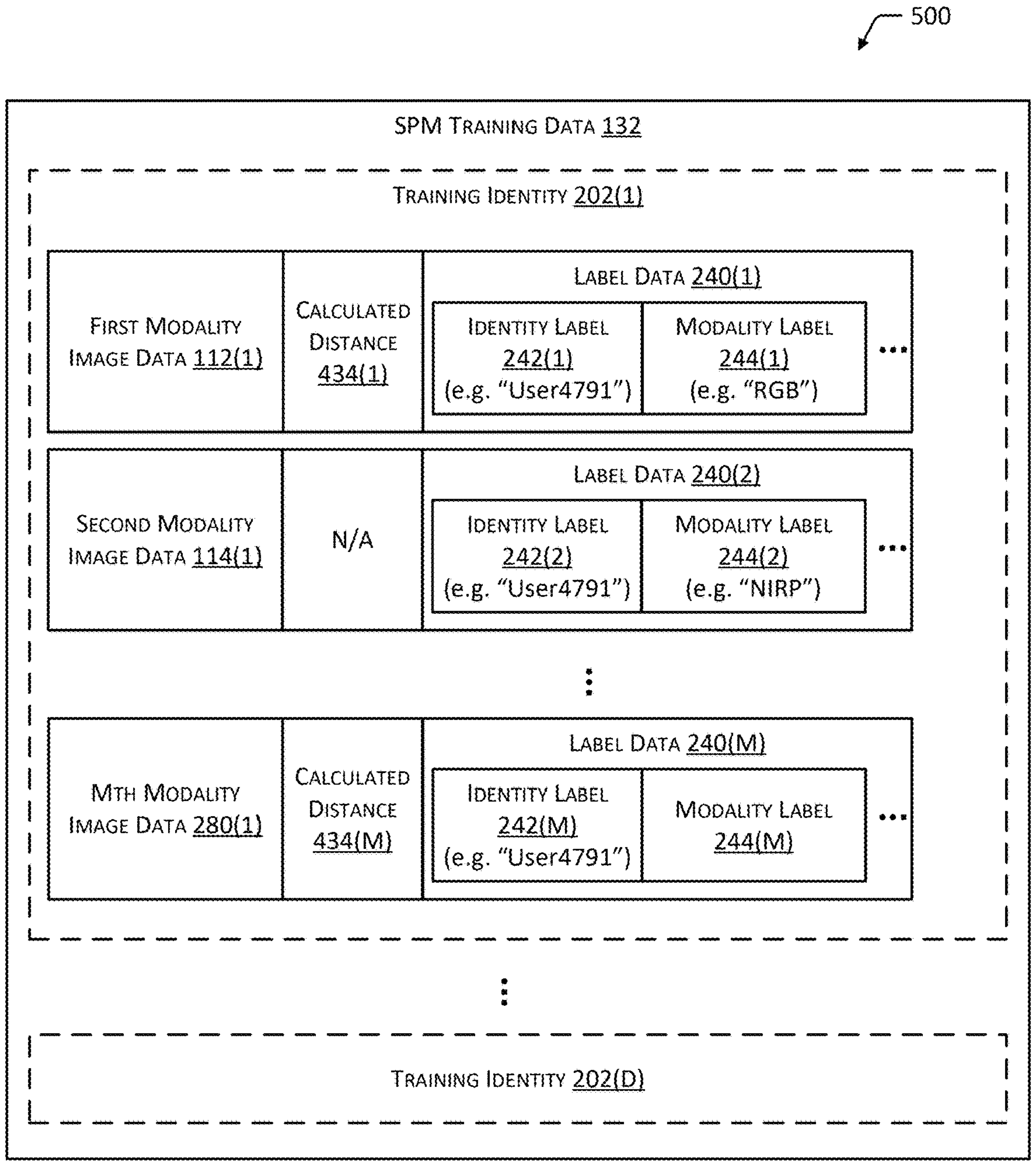
FIG. 5 illustrates training data for training of the suitability prediction module that accepts different modalities as inputs, according to some implementations.

FIG. 5 illustrates at 500 SPM training data 132 for training of the SPM 130, according to some implementations. The SPM training data 132 comprises a plurality of images that are representative of a plurality of training identities, 202(1), 202(2), . . . , 202(D). Each training identity 202 is considered to be unique with respect to the other training identities 202.

In some implementations, the SPM training data 132 may be derived or otherwise be based on, the representation training data 142. For example, the image data associated with various modalities may be obtained from the representation training data 142.

Each training identity 202(1)-202(D) includes modality image data, a calculated distance 434 and associated label data 240. The label data 240 may comprise information such as the ID label 242, modality label 244, and so forth. The calculated distance 434 may be determined as described with regard to FIG. 4.

In the implementation described with regard to FIG. 4, and the resulting SPM training data 132 shown here, the calculated distance 434 for a given instance of image data is relative to the identity centroid 416 determined using the second modality image data 114. As a result, there is no calculated distance 434 associated with the second modality image data 114. In other implementations, other techniques may be used. For example, if the calculated distance 434 is determined with regard to an identity centroid 416 based on third modality image data 116, the instances of second modality image data 114 would have an associated calculated distance 434 while the instances of third modality image data 116 would not.

In some implementations data augmentation techniques may be used to increase the number of samples in the SPM training data 132. Data augmentation may include applying one or more effects, transforms, or filters to a sample of image data. For example, a Gaussian blur filter may be used to process one instance of first modality image data 112 to generate another instance of first modality image data 112. In another example, a downsampling algorithm may be used to process one instance of image data and generate another instance with a lower resolution.

The instances of SPM training data 132 that are generated using data augmentation techniques may have their corresponding label data 240 modified. For example, blurring or downsampling may result in insufficient features being present in the resulting data to indicate a particular identity. Continuing the example, the identity label 242 may be modified, such as to indicate a different identity.

Figure 6:
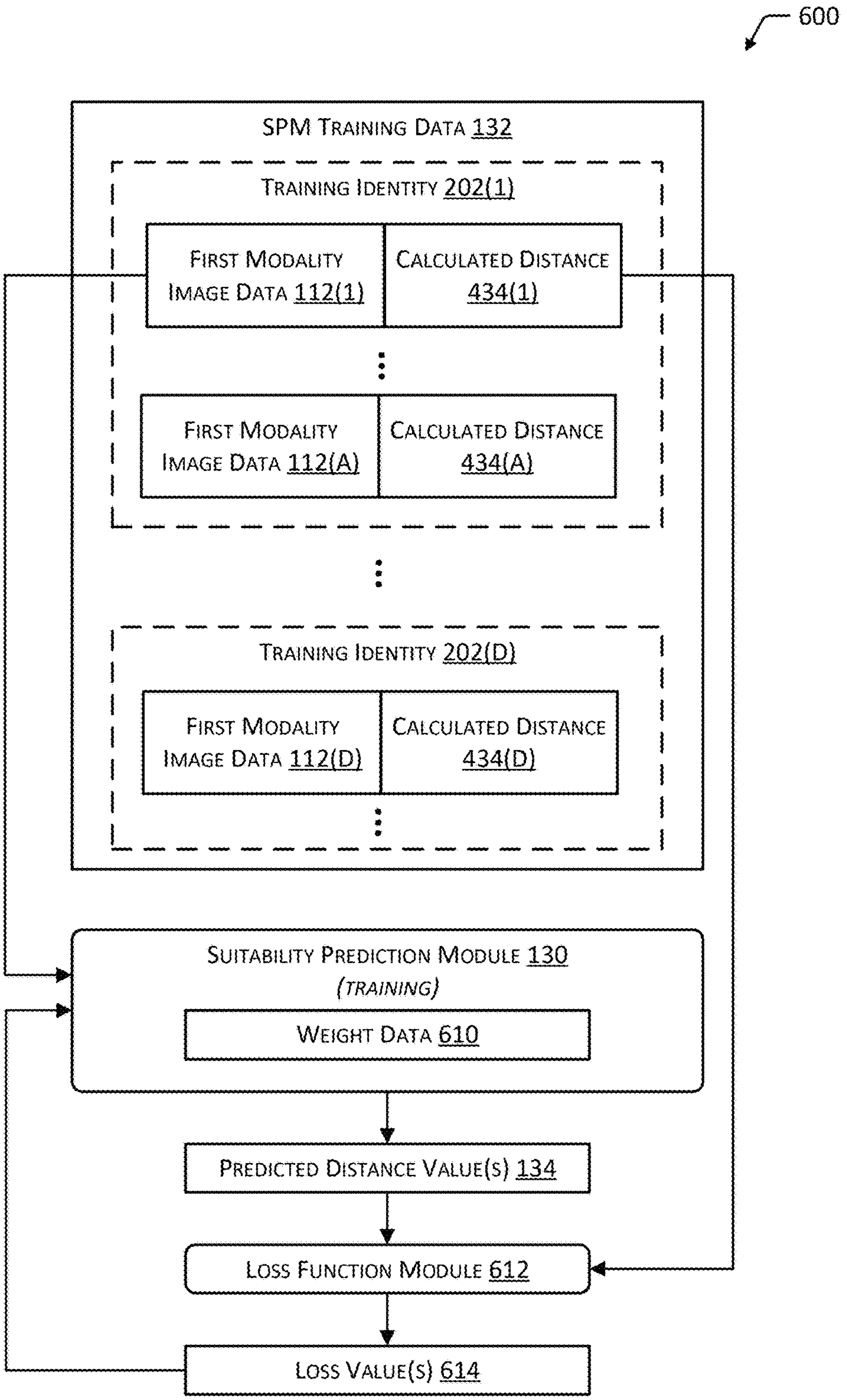
FIG. 6 illustrates training of the suitability prediction module, according to some implementations.

FIG. 6 illustrates at 600 training of the SPM 130, according to some implementations. The SPM 130 comprises a machine learning system, such as a neural network or other architecture, that has been trained using SPM training data 132.

The SPM training data 132 comprises pairs of input image data 110 and associated calculated distances 434 as described with regard to FIG. 4. For example, the SPM training data 132 may comprise first modality image data 112 and associated calculated distances 434 for a plurality of training identities 202.

The SPM 130 comprises a machine learning system, such as a neural network or other architecture. The SPM 130 may comprise weight data 610. In some implementations, the weight data 610 may be initialized to random values before training begins. The weight data 610 is indicative of weights, bias values, or other values associated with nodes in its machine learning network. Once trained, the weight data 610 is representative of the training.

During a training iteration, the SPM 130 uses a sample of input image data 110 as input and generates one or more PDVs 134. A loss function module 612 accepts as input the one or more PDVs 134 and the calculated distance 434 that is associated with the sample of input image data 110 and generates a loss value 614. The loss function module 612 may implement one or more loss functions, such as mean square error (MSE) loss, Huber loss, log loss, binary cross-entropy loss, categorical cross-entropy loss, and so forth. The loss value 614 provides feedback that is then returned to the SPM 130. For example, the loss value 614 may be used to modify one or more values of the weight data 610. Over many training iterations, the PDVs 134 may begin to converge to a value that is approximately the same as the calculated distance 434.

Training may be deemed to be complete based on one or more criteria. For example, training may be deemed to be complete when a threshold number of PDVs 134 are within a specified value of the calculated distance 434 for their respective samples. Once training is complete, the weight data 610 may be "frozen" and the SPM 130 may be used for inference, such as shown at FIG. 1.

As mentioned with regard to FIG. 5, the SPM training data 132 may include image data associated with other modalities. The SPM 130 may be trained to generate one or more PDVs 134 for image data that is associated with a plurality of modalities. For example, the SPM 130 may be trained to accept first modality image data 112 and generate a first PDV 134 associated with a first representation space 322, a second PDV 134 associated with a second representation space 322, and so forth.

In some implementations the SPM 130 may be trained to provide PDVs 134 that are associated with a plurality of representation spaces 322. For example, the SPM training data 132 may comprise a first calculated distance 434(1) associated with the representation space 322(2), a second calculated distance 434(2) associated with representation space 322(3), and so forth. The SPM 130 may be trained to provide a plurality of PDVs 134, such as one PDV 134 for each representation space 322 in use.

Figure 7:
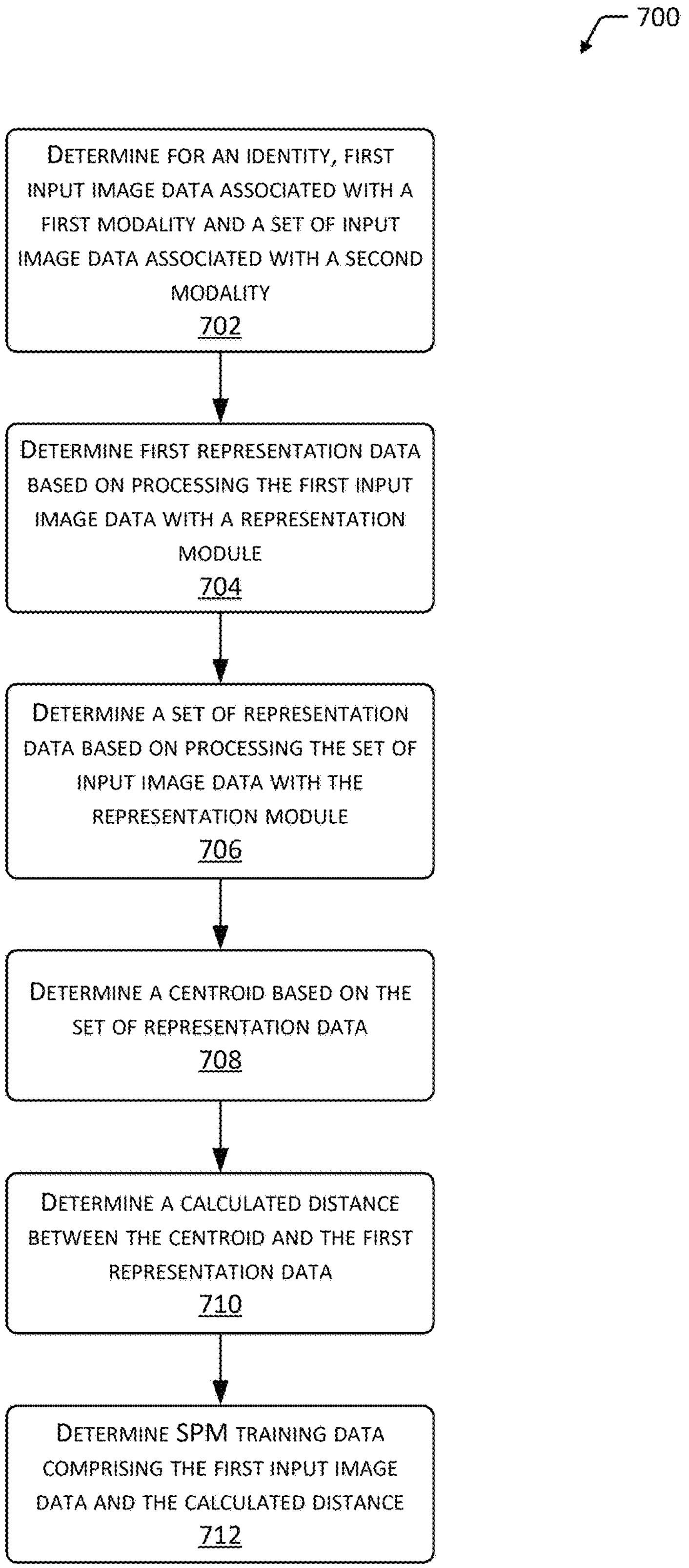
FIG. 7 is a flow diagram of a process to determine the training data for training of the suitability prediction module, according to some implementations.

FIG. 7 is a flow diagram 700 of a process to determine the SPM training data 132 for training of the SPM 130, according to some implementations. The process may be implemented by one or more computing devices 106, 120, or other devices.

At 702 for an identity, first input image data associated with a first modality, and a first set of input image data associated with a second modality is determined. For example, a portion of the representation training data 142 or other training data may be acquired that comprises multi-modal input image data 110 for given identities.

At 704 first representation data 144 is determined based on processing the first input image data 110 with a first representation module 140. The first representation data 144 is associated with a first representation space 322.

At 706 a first set of representation data 144 is determined based on processing the first set of input image data 110 with the first representation module 140. The first set of representation data 144 is also associated with the first representation space 322. For example, the second modality image data 114 is processed to determine the presumed suitable data 410.

At 708 a centroid is determined based on the first set of representation data 144. For example, first identity centroid data 414(1) based on the first set of representation data 144 may be calculated using the centroid module 412. The first identity centroid data 414 is indicative of a first location within the first representation space 322.

At 710 a first calculated distance 434 between the first location specified by the first identity centroid data 414 and the first representation data 144 is determined. For example, the calculated distance 434(1) may be calculated using the distance calculation module 432 to determine the distance in the first representation space 322.

At 712 SPM training data 132 is determined comprising the first input image data 110 and a distance value that is based on the first calculated distance 434(1). In some implementations, the distance value may be based on a plurality of distance values. In a first ensemble configuration, individual calculated distances 434 may be determined in a plurality of representation spaces 322, and the calculated distance 434 included in the SPM training data 132 may be determined based on these individual calculated distances 434. For example, the calculated distance 434 included in the SPM training data 132 may comprise an average of individual calculated distances 434. In another example, the calculated distance 434 included in the SPM training data 132 for an individual representation space 322 may be normalized, and the normalized value may be used to determine the calculated distance 434. In a second ensemble configuration, individual calculated distances 434 may be determined in a plurality of representation spaces 322, and a plurality of individual calculated distances 434 may be stored in the SPM training data 132 in association with their respective representation space 322.

Figure 8:
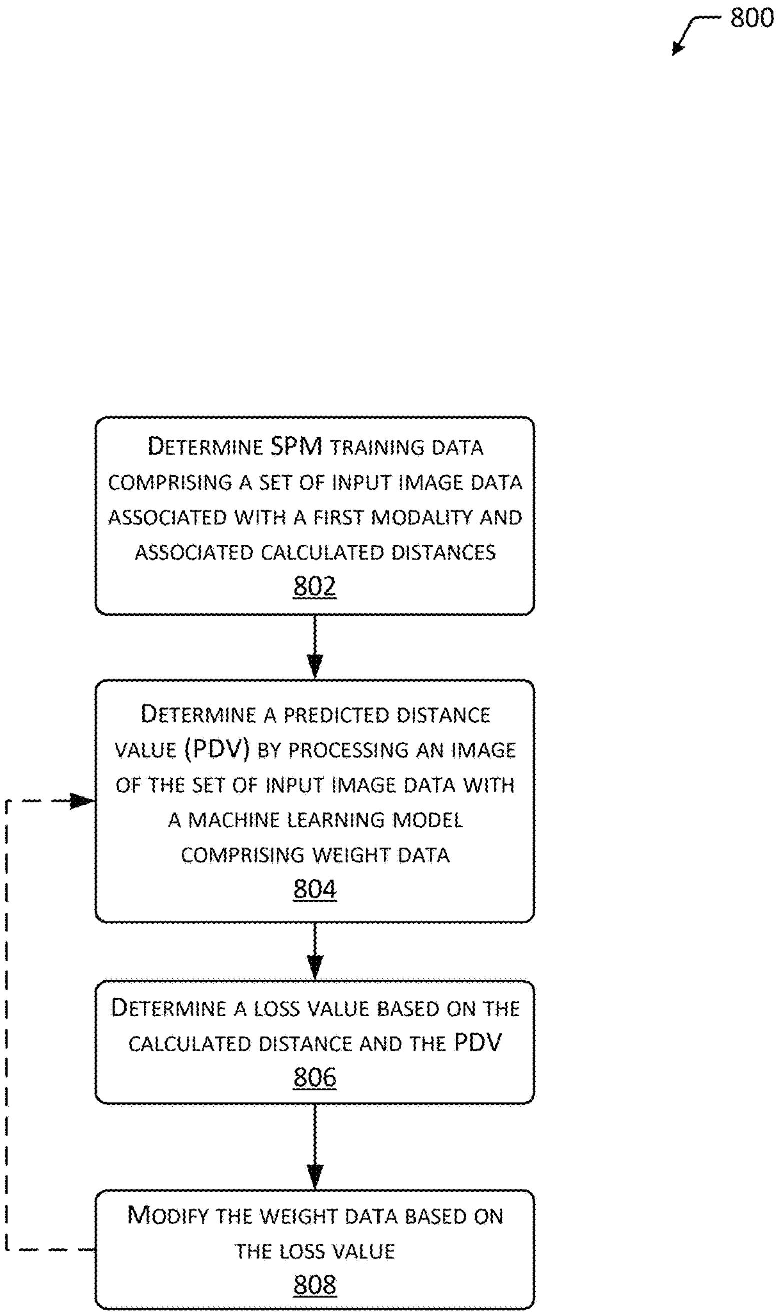
FIG. 8 is a flow diagram of a process to train the suitability prediction module, according to some implementations.

FIG. 8 is a flow diagram 800 of a process to train the SPM 130, according to some implementations. The process may be implemented by one or more computing devices 106, 120, or other devices.

At 802 the SPM training data 132 is determined. The SPM training data 132 may comprise a set of input image data 110 that is associated with a first modality and associated calculated distances 434.

At 804 a PDV 134 is determined by processing an image of the set of input image data 110 with the SPM 130 that comprises a machine learning model comprising weight data 610. For example, first modality image data 112 may be provided as input to the SPM 130.

At 806 a loss value 614 is determined based on the calculated distance 434 and the PDV 134. For example, a loss function may be used to calculate the loss value 614.

At 808 at least a portion of the weight data 610 is modified based on the loss value 614. For example, the loss value 614 may be provided as feedback to the machine learning model, and the values of one or more weights in one or more layers of the model may be modified.

The operation described with regard to 804 through 808 may be repeated until training is deemed to be complete. Training may be deemed to be complete based on one or more criteria. For example, training may be deemed to be complete when a threshold number of PDVs 134 are within a specified value of the calculated distance 434 for their respective samples. Once training is complete, the weight data 610 may be "frozen" and the SPM 130 may be used for inference, such as shown at FIG. 1.

In other implementations, other training methods may be used to train the SPM 130.

Figure 9:
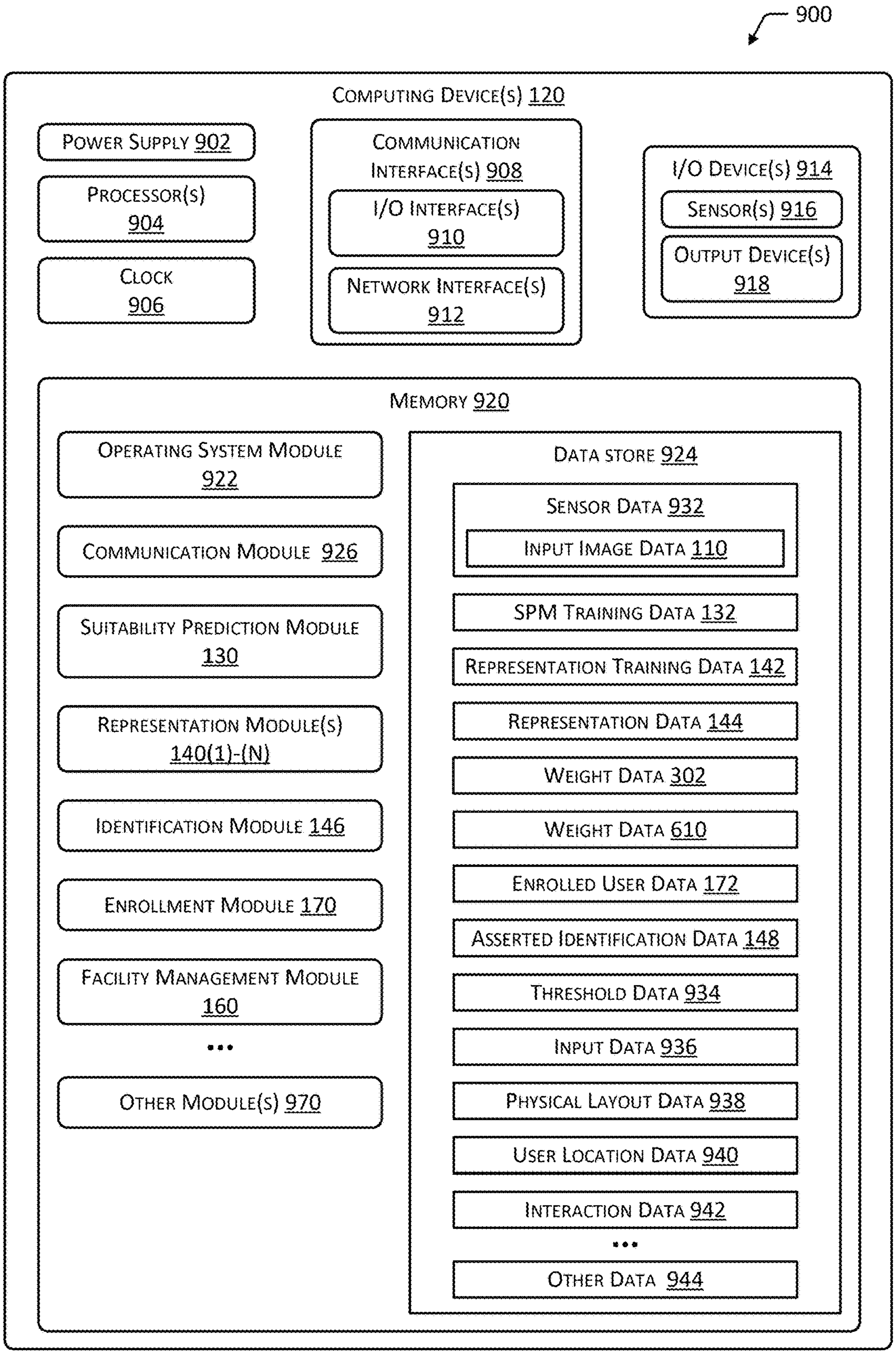
FIG. 9 is a block diagram of a computing device to implement the system, according to some implementations.

FIG. 9 is a block diagram 900 of a computing device 120 to implement the system 100, according to some implementations. The computing device 120 may be within the input device 104, may comprise a server, and so forth. The computing device 120 may be physically present at the facility, may be accessible by a network, or a combination of both. The computing device 120 does not require end-user knowledge of the physical location and configuration of the system that delivers the services. Common expressions associated with the computing device 120 may include "embedded system", "on-demand computing", "software as a service (Saas)", "platform computing", "network-accessible platform", "cloud services", "data centers", and so forth. Services provided by the computing device 120 may be distributed across one or more physical or virtual devices.

One or more power supplies 902 may be configured to provide electrical power suitable for operating the components in the computing device 120. The one or more power supplies 902 may comprise batteries, capacitors, fuel cells, photovoltaic cells, wireless power receivers, conductive couplings suitable for attachment to a power source such as provided by an electric utility, and so forth. The computing device 120 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The computing device 120 may include one or more communication interfaces 908 such as input/output (I/O) interfaces 910, network interfaces 912, and so forth. The communication interfaces 908 enable the computing device 120, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 916, keyboard, mouse, scanner, and so forth. The I/O devices 914 may also include output devices 918 such as one or more of a display device, printer, audio speakers, and so forth. In some embodiments, the I/O devices 914 may be physically incorporated with the computing device 120 or may be externally placed. The sensors 916 may comprise the camera 108, smartcard readers, touch sensors, microphones, and so forth.

The network interfaces 912 may be configured to provide communications between the computing device 120 and other devices, such as routers, access points, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, and so forth.

The computing device 120 may also include one or more buses or other internal communications hardware or software that allow for the transfer of data between the various modules and components of the computing device 120.

As shown in FIG. 9, the computing device 120 includes one or more memories 920. The memory 920 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 920 provides storage of computer-readable instructions, data structures, program modules, and other data for the operation of the computing device 120. Several functional modules are shown stored in the memory 920, although the same functionality may alternatively be implemented in hardware, firmware, or as a system on a chip (SoC).

The memory 920 may include at least one operating system (OS) module 922. The OS module 922 is configured to manage hardware resource devices such as the I/O interfaces 910, the I/O devices 914, the communication interfaces 908, and provide various services to applications or modules executing on the processors 904. The OS module 922 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 926 may be configured to establish communications with the computing devices 120 or other devices. The communications may be authenticated, encrypted, and so forth.

The SPM 130 may be stored in the memory 920.

The representation modules 140(1)-(N) may be stored in the memory 920.

The identification module 146 may be stored in the memory 920.

The enrollment module 170 may be stored in the memory 920.

Also stored in the memory 920 may be a data store 924. These modules may be executed as foreground applications, background tasks, daemons, and so forth. The data store 924 may use a flat file, database, linked list, tree, executable code, script, or other data structure to store information. In some implementations, the data store 924 or a portion of the data store 924 may be distributed across one or more other devices including other computing devices 120, network attached storage devices, and so forth.

The data store 924 may store sensor data 932, the representation training data 142, representation data 144, enrolled user data 172, asserted identification data 148, and other data.

The data store 924 may store weight data 302 such as determined during training of the one or more representation modules 140. The weight data 302 may comprise weight values, bias values, and other data determined during training of the machine learning network that is representative of the training of the network.

The data store 924 may store threshold data 934 comprising one or more threshold values used during operation of the system 100.

The data store 924 may store input data 936. For example, the input data 936 may comprise data obtained from external to the system 100, such as from a user or another system.

In some implementations, one or more of the input image data 110 may be stored during processing by the representation module(s) 140, or other modules. For example, the input device 104 may acquire the input image data 110, determine representation data 144 based on the input image data 110, and then erase the input image data 110. The resulting representation data 144 may then be sent to a server or other computing device 120 to perform enrollment, for comparison to assert an identity, and so forth.

The facility management module 160 may be stored in the memory 920. The facility management module 160 may perform various functions, such as tracking items between different inventory locations, to and from carts, generating restocking orders, directing operation of robots within the facility, using the asserted identification data 148 to associate a particular user identity with a user in the facility, and so forth. During operation, the facility management module 160 may access sensor data 932 such as input image data 110, or data from other sensors 916.

Information used by the facility management module 160 may be stored in the data store 924. For example, the data store 924 may be used to store physical layout data 938, sensor data 932, asserted identification data 148, user location data 940, interaction data 942, and so forth. For example, the sensor data 932 may comprise the input image data 110 obtained from an input device 104 associated with the facility.

The physical layout data 938 may provide information indicative of where input devices 104, cameras, weight sensors, antennas for radio receivers, inventory locations, and so forth are within the facility with respect to one another. For example, the physical layout data 938 may comprise information representative of a map or floor plan of the facility with relative positions of gates with input devices 104 and inventory locations.

The facility management module 160 may generate the user location data 940 that is indicative of the location of the user within the facility. For example, the facility management module 160 may use image data obtained by the cameras to determine a location of the user. In other implementations, other techniques may be used for determining the user location data 940. For example, data from a smart floor may be used to determine the location of the user.

The identification data 174 may be associated with user location data 940. For example, the user enters the facility and has their hand 102 scanned by the input device 104, resulting in asserted identification data 148 that is associated with their time of entry and the input device 104 location. The user location data 940 indicative of a path of the user that begins at the input device 104 location at the time of entry may be associated with the user identifier in the asserted identification data 148.

Based on the user location data 940 and the interaction data 942, a particular interaction may be associated with an account of a particular user. For example, if the user location data 940 indicates that the user is present in front of inventory location 1397 at time 09:02:02 and the interaction data 942 indicates a pick of a quantity of one item from an area on inventory location 1397 at 09:04:13, the user may be billed for that pick.

The facility management module 160 may use the sensor data 932 to generate the interaction data 942. The interaction data 942 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 942 that indicates what item the user picked from a particular lane on a shelf, and then use this interaction data 942 to adjust the count of inventory stowed at that lane. The interaction data 942 may then be used to bill an account associated with the user identifier that is associated with the user who picked the item.

The facility management module 160 may process the sensor data 932 and generate output data. For example, based on the interaction data 942, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 970 may also be present in the memory 920 as well as other data 944 in the data store 924. For example, a billing module may use the interaction data 942 and the asserted identification data 148 to bill an account associated with a particular user.

The devices and techniques described in this disclosure may be used in a variety of other settings. For example, the system 100 may be used in conjunction with a point-of-sale (POS) device. The user may present their hand 102 to an input device 104 to provide an indication of intent and authorization to pay with an account associated with the asserted identification data 148. In another example, a robot may incorporate an input device 104. The robot may use the asserted identification data 148 to determine whether to deliver a parcel to the user, and based on the asserted identification data 148, which parcel to deliver.

While the input to the system 100 is discussed with respect to image data, the system may be used with other types of input. For example, the input may comprise data acquired from one or more sensors 916, data generated by another system, and so forth. For example, instead of image data produced by the camera 108, the input to the system 100 may comprise an array of data. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memories, storing first computer-executable instructions; and one or more hardware processors to execute the first computer-executable instructions to:

determine, for an identity:

first input image data associated with a first modality, and a set of second input image data comprising one or more images associated with at least a second modality;

wherein the first input image data is deemed to be of unknown suitability; and wherein the set of second input image data is deemed suitable;

determine first representation data based on processing the first input image data with a first representation module, wherein the first representation data is associated with a first representation space, and wherein the first representation data is designated as unknown suitability data;

determine a set of second representation data based on processing second modality images of the set of second input image data with the first representation module, wherein the set of second representation data is associated with the first representation space, and wherein the set of second representation data is designated as presumed suitable data;

determine first identity centroid data based on the set of second representation data, wherein the first identity centroid data is indicative of a first location within the first representation space;

determine a first calculated distance between the first location specified by the first identity centroid data and the first representation data, wherein the first calculated distance is used to estimate suitability of the first input image data; and determine first training data comprising the first input image data and a distance value that is based on the first calculated distance.

2. The system of claim 1, wherein the one or more hardware processors are to execute the first computer-executable instructions to:

determine third representation data based on processing the first input image data with a second representation module, wherein the second representation data is associated with a second representation space;

determine a set of fourth representation data based on processing the set of second input image data with the second representation module, wherein the set of fourth representation data is associated with the second representation space;

determine second identity centroid data based on the set of fourth representation data, wherein the second identity centroid data is indicative of a second location within the second representation space;

determine a second calculated distance between the second location specified by the second identity centroid data and the third representation data; and determine the distance value based on the first calculated distance and the second calculated distance.

3. The system of claim 1, wherein the one or more hardware processors are to execute the first computer-executable instructions to:

train a machine learning model, using the first training data, to determine a predicted distance value based on input image data associated with the first modality.

4. The system of claim 3, wherein the one or more hardware processors are to execute the first computer-executable instructions to:

acquire third input image data that is associated with the first modality;

determine a second predicted distance value using the third input image data as input to the machine learning model;

determine the second predicted distance value is less than a threshold value; and determine third representation data based on processing the third input image data with a second representation module, wherein the third representation data is associated with a second representation space.

5. The system of claim 1, wherein further comprising:

a visible light color camera; and a near-infrared camera, wherein:

the first input image data is acquired using the visible light color camera; and the set of second input image data is acquired using the near-infrared camera.

6. The system of claim 1, wherein the set of second input image data comprises:

a second modality image associated with the second modality; and a third modality image associated with a third modality, and wherein the one or more hardware processors to execute the first computer-executable instructions to:

determine third representation data based on processing the first input image data with a second representation module, wherein the second representation data is associated with a second representation space;

determine a set of fourth representation data based on processing the third modality image with the second representation module, wherein the set of fourth representation data is associated with the second representation space;

determine second identity centroid data based on the set of fourth representation data, wherein the second identity centroid data is indicative of a second location within the second representation space;

determine a second calculated distance between the second location specified by the second identity centroid data and the third representation data; and determine the first training data comprising the first input image data and a second distance value that is based on the second calculated distance.

7. A computer-implemented method comprising:

determining, for an identity:

first input image data associated with a first modality; and a set of second input image data comprising one or more images associated with at least a second modality, wherein the first input image data is deemed to be of unknown suitability, and wherein the set of second input image data is deemed suitable;

determining first representation data based on processing the first input image data with a first representation module, wherein the first representation data is associated with a first representation space, and wherein the first representation data is designated as unknown suitability data;

determining a set of second representation data based on processing at least a portion of the set of second input image data with the first representation module, wherein the set of second representation data is associated with the first representation space, and wherein the set of second representation data is designated as presumed suitable data;

determining first identity centroid data based on the set of second representation data, wherein the first identity centroid data is indicative of a first location within the first representation space;

determining a first calculated distance between the first location specified by the first identity centroid data and the first representation data, wherein the first calculated distance is used to estimate the suitability of the first input image data; and determining first training data comprising the first input image data and a distance value that is based on the first calculated distance.

8. The computer-implemented method of claim 7, wherein the set of second representation data comprises a plurality of instances of representation data, the method further comprising:

calculating a geometric center of the plurality of instances of representation data, wherein the first identity centroid data comprises the geometric center.

9. The computer-implemented method of claim 7, further comprising:

training a machine learning model, using the first training data, to determine a predicted distance value based on input image data associated with the first modality.

10. The computer-implemented method of claim 7, further comprising:

training a machine learning model, using the first training data, to determine a predicted distance value (PDV) based on input image data associated with the first modality;

acquiring third input image data that is associated with the first modality;

determining a first PDV using the third input image data as input to the machine learning model;

determining the first PDV is less than a threshold value; and determining third representation data based on processing the third input image data with a second representation module, wherein the third representation data is associated with a second representation space.

11. The computer-implemented method of claim 10, further comprising:

determining identification data that is associated with a first user; and determining enrolled user data comprising the identification data and the third representation data.

12. The computer-implemented method of claim 7, further comprising:

determining third representation data based on processing the first input image data with a second representation module, wherein the second representation data is associated with a second representation space;

determining a set of fourth representation data based on processing at least a portion of the set of second input image data with the second representation module, wherein the set of fourth representation data is associated with the second representation space;

determining second identity centroid data based on the set of fourth representation data, wherein the second identity centroid data is indicative of a second location within the second representation space;

determining a second calculated distance between the second location specified by the second identity centroid data and the second representation data; and determining the distance value based on the first calculated distance and the second calculated distance.

13. The computer-implemented method of claim 7, wherein:

the first modality is associated with image data acquired using a visible light color camera; and the second modality is associated with image data acquired using a near-infrared camera.

14. The computer-implemented method of claim 7, wherein:

the first modality is associated with image data acquired using an end-user device; and the second modality is associated with image data acquired using a dedicated device.

15. A computer-implemented method comprising:

determining, for an identity:

first input image data associated with a first modality; and a set of second input image data comprising one or more images associated with at least a second modality, wherein the first input image data is deemed to be of unknown suitability, and wherein the set of second input image data is deemed suitable;

determining first representation data based on processing the first input image data with a first representation module, wherein the first representation data is associated with a first representation space, and wherein the first representation data is designated as unknown suitability data;

determining a set of second representation data based on processing at least a portion of the set of second input image data with the first representation module, wherein the set of second representation data is associated with the first representation space, and wherein the set of second representation data is designated as presumed suitable data;

determining first identity centroid data based on the set of second representation data, wherein the first identity centroid data is indicative of a first location within the first representation space;

determining a first calculated distance between the first location specified by the first identity centroid data and the first representation data, wherein the first calculated distance is used to estimate suitability of the first input image data;

determining first training data comprising the first input image data and a distance value that is based on the first calculated distance;

training a first machine learning model using the first training data;

determining third input image data, wherein the third input image data is acquired using the first modality;

determining one or more predicted distance values (PDVs) using the third input image data as input to the first machine learning model;

determining, based on the one or more PDVs, that the third input image data is suitable for further processing; and determining third representation data based on processing the third input image data with a second representation module, wherein the third representation data is associated with a second representation space.

16. The computer-implemented method of claim 15, further comprising:

determining identification data that is associated with a first user; and determining enrolled user data comprising the identification data and the third representation data.

17. The computer-implemented method of claim 15, wherein the set of second representation data comprises a plurality of instances of representation data, the method further comprising:

calculating a geometric center of the plurality of instances of representation data, wherein the first identity centroid data comprises the geometric center.

18. The computer-implemented method of claim 15, further comprising:

determining fourth representation data based on processing the first input image data with a third representation module, wherein the fourth representation data is associated with a third representation space;

determining a set of fifth representation data based on processing at least a portion of the set of second input image data with the third representation module, wherein the set of fifth representation data is associated with the third representation space;

determining second identity centroid data based on the set of fifth representation data, wherein the second identity centroid data is indicative of a second location within the third representation space;

determining a second calculated distance between the second location specified by the second identity centroid data and the fourth representation data; and determining the distance value based on the first calculated distance and the second calculated distance.

19. The computer-implemented method of claim 15, wherein:

the first modality is associated with image data acquired using an end-user device; and the second modality is associated with image data acquired using a dedicated device.

20. The computer-implemented method of claim 15, wherein:

the first modality is associated with image data acquired using a visible light color camera; and the second modality is associated with image data acquired using a near-infrared camera.

* * * * *